(12) United States Patent
Albrecht et al.

(10) Patent No.: US 9,855,622 B2
(45) Date of Patent: Jan. 2, 2018

(54) AUTOMATIC AND SEMI-AUTOMATIC WELDING SYSTEMS AND METHODS

(75) Inventors: Bruce Patrick Albrecht, Neenah, WI (US); Todd Gerald Batzler, Hortonville, WI (US); Michael Leo Weller, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1600 days.

(21) Appl. No.: 13/114,968

(22) Filed: May 24, 2011

(65) Prior Publication Data

US 2011/0290765 A1  Dec. 1, 2011

Related U.S. Application Data

(60) Provisional application No. 61/348,427, filed on May 26, 2010.

(51) Int. Cl.
  *B23K 9/32*   (2006.01)
  *B23K 9/00*   (2006.01)
  (Continued)

(52) U.S. Cl.
  CPC .............. *B23K 9/32* (2013.01); *B23K 9/00* (2013.01); *B23K 9/0953* (2013.01); *B23K 26/0884* (2013.01); *G09B 19/24* (2013.01)

(58) Field of Classification Search
  USPC ........ 219/74, 78.01, 121.51, 121.34, 121.11, 219/121.12, 130.5, 130.51; 700/245–252
  See application file for complete search history.

(56) References Cited

U.S. PATENT DOCUMENTS

| 6,019,606 | A | * | 2/2000 | Yamamoto et al. ............ 434/45 |
| 2007/0083291 | A1 | * | 4/2007 | Nagatsuka et al. ........... 700/252 |
| 2009/0071949 | A1 | * | 3/2009 | Harris ........................ 219/130.1 |

FOREIGN PATENT DOCUMENTS

| EP | 0377755 A1 | 7/1990 |
| EP | 1136168 A2 | 9/2001 |

(Continued)

OTHER PUBLICATIONS

International Search Report for application No. PCT/US2011/038071 mailed Aug. 23, 2011.

(Continued)

*Primary Examiner* — Brian Jennison
(74) *Attorney, Agent, or Firm* — McAndrews, Held & Malloy, Ltd.

(57) ABSTRACT

Methods and devices for control for an automated welding system are provided. Disclosed control methods may include receiving a data set including one or more features of a joint to be welded and receiving a weld procedure for the joint to be welded. The weld procedure for the joint is determined based on a sample virtual weld performed by an operator, a stored procedure developed for a substantially similar weld joint, or a combination thereof. The method may further include determining one or more desired changes to the weld procedure based on the received features of the joint to be welded and generating an updated weld procedure by altering one or more parameters of the received weld procedure in accordance with the one or more desired changes, wherein the one or more parameters are included within a predetermined allowable data set.

20 Claims, 4 Drawing Sheets

(51) Int. Cl.
*B23K 9/095* (2006.01)
*B23K 26/08* (2014.01)
*G09B 19/24* (2006.01)

(56) References Cited

FOREIGN PATENT DOCUMENTS

EP    1777600 A1   4/2007
WO    2010000003 A2   1/2010

OTHER PUBLICATIONS

Kim J S et al: "A Robust Method for Vision-Based Seam Tracking in Robotic Arc Welding", Proceedings of the International Symposium on Intelligent Control. Monterey, Aug. 27-29, 1995; [Proceedings of the International Symposium on Intelligent Control], New York, IEEE, US, Aug. 27, 1995 (Aug. 27, 1995), pp. 363-368, XP000684186, ISBN: 978-0-7803-2723-8.

* cited by examiner

AUTOMATIC AND SEMI-AUTOMATIC WELDING SYSTEMS AND METHODS

CROSS REFERENCE TO RELATED APPLICATIONS

This application is a Non-Provisional patent application of U.S. Provisional Patent Application No. 61/348,427, entitled, "Simplified Teaching of Traditional and Portable Robots," filed May 26, 2010, which is herein incorporated by reference.

BACKGROUND

The invention relates generally to welding systems, and, more particularly, to automatic and semi-automatic welding systems and methods.

Welding is a process that has become increasingly ubiquitous in various industries and applications. While many of these welding processes have been successfully automated, thus reducing the need for manual welding operators, a large number of applications continue to exist in which automation is not utilized due to factors such as the variability in the encountered weld joints, the need for adaptation while welding, and so forth. For example, in these applications, a welding operator may encounter difficulties when attempting to train a robotic welding device to react to non-uniformities in the weld joint. In certain welding environments, such as shipbuilding, such factors continue to necessitate utilization of manual welding operators, thus limiting the efficiency of welding in these contexts. Accordingly, there exists a need for improved welding systems and methods that overcome such drawbacks and increase the quantity and type of applications in which automated welding may be utilized.

BRIEF DESCRIPTION

In an exemplary embodiment, a method of control for an automated welding system includes receiving a data set including one or more features of a joint to be welded. The method also includes receiving a weld procedure for the joint to be welded, wherein the weld procedure for the joint is determined based on a sample virtual weld performed by an operator. The method further includes determining one or more desired changes to the weld procedure based on the received features of the joint to be welded and generating an updated weld procedure by altering one or more parameters of the received weld procedure in accordance with the one or more desired changes when the one or more parameters are included within a predetermined allowable data set.

In another embodiment, a welding system includes a welding power supply including power conversion circuitry adapted to receive primary power and to convert the primary power to a weld power output. The welding system also includes control circuitry adapted to receive a pseudoweld procedure for a weld joint and to generate a weld procedure for welding the weld joint based on the pseudoweld procedure, information regarding a feature of the weld joint, and an allowed parameter set. The welding system further includes a robotic welding device adapted to receive the weld power from the welding power supply and a control signal from the control circuitry, wherein the control signal encodes parameters enabling the robot welding device to perform the weld procedure on the weld joint.

In another embodiment, a robotic welding device is adapted to receive a data set including one or more features of a joint to be welded, determine a weld procedure for the joint to be welded based on the received data set, perform a weld operation by implementing the weld procedure on the weld joint, receive a desired weld procedure change from an operator during the weld operation, and perform the weld operation by implementing the weld procedure change on the weld joint when the weld procedure change is within a predefined allowable subset.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, systems and methods for controlling and performing a welding operation utilizing a robotic welding device and a welding operator are provided. Further, methods and systems for training a robotic welding device to properly perform a desired weld procedure are also disclosed. For example, in certain embodiments, a welding operator may generate a pseudoweld procedure for a given weld joint by utilizing a virtual reality system that is preloaded with information regarding the joint to be welded. For example, the virtual reality system may receive information regarding the weld joint from a suitable weld evaluation system, such as a laser scanning system. In these embodiments, a robotic welding device may be trained to weld the given weld joint based on the pseudoweld procedure and one or more known parameters of the given weld joint. That is, control circuitry for a robotic welding device may receive inputs, such as features of a weld joint (e.g., joint thickness, weld bead profile, material thickness, etc.), and may modify the pseudoweld procedure based on those inputs within an allowed parameter set. For example, the allowed parameter set, within which the robotic welding device is permitted to make alterations, may include predetermined tolerances for parameters of a weld procedure, such as travel speed or torch angle. In this way, the robotic welding devices disclosed herein may alter the pseudoweld procedure to correct one or more operator errors or inefficiencies. The foregoing features may facilitate the automated or semi-automated welding of weld joints that would typically necessitate manual welding since operator input specific to the given weld joint is incorporated into the training of the robotic welding device. Additionally, these features may enable a weld procedure to be developed for the welding of a weld joint by utilizing input from both a manual operator as well as a robotic welding device, although one or both of the manual operator and the robotic welding device may perform the weld on the weld joint.

Further, in some embodiments, the automated and manual welding systems disclosed herein may operate in conjunction with one another during a welding operation to develop and perform a weld procedure on the weld joint. That is, in some embodiments, the operator and the robotic welding device may operate in a welding mode instead of a training mode to develop and implement a suitable weld procedure during the welding operation. A variety of modes may be utilized in these embodiments to complete welding of the weld joint in an efficient manner. For instance, in one embodiment, the robotic welding device may be enabled to perform the weld procedure without substantial operator input. In other modes, however, the robotic welding device may cooperate with a manual operator to complete the weld procedure in a semi-automatic or manual manner. These and other features of the disclosed welding systems that merge automatic and manual weld operations are described in more detail below.

Still further, in some embodiments, one or more devices may be utilized to monitor torch location or speed during a welding or training operation. For example, angle sensing technology may be utilized to emit infrared radiation to detect a torch angle. For further example, a global positioning system may be utilized to track the travel speed and/or location of the weld device. Still further, additional devices, such as the reflective surfaces utilized in virtual reality system may also be employed.

Additionally, it should be noted that in some embodiments, the automatic welding devices described herein may be replaced with an inexperienced human operator utilizing one or more devices that facilitate the desired welding of the weld joint. For example, in one embodiment, an inexperienced welder may wear a helmet, glove, or other augmenting device that provides the inexperienced welder with parameters of the weld procedure. In this way, the pseudoweld may be developed by an experienced welding operator, but an inexperienced welding operator may perform the weld on the weld joint. That is, in certain embodiments, a welding operator may utilize an augmented reality system to facilitate the welding operation.

Figure 1:
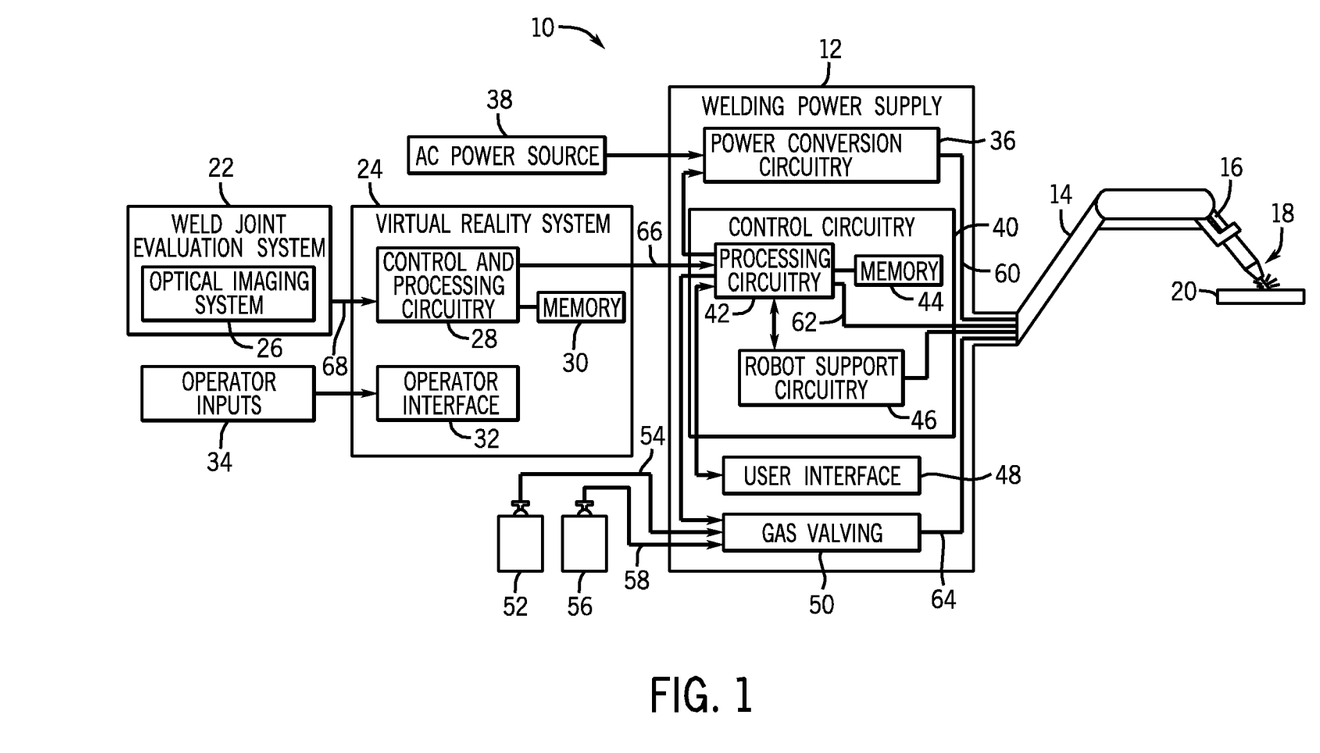
FIG. 1 is a block diagram illustrating an embodiment of a welding system adapted to power, control, and provide supplies to a weld operation in accordance with an aspect of the present disclosure.

Turning now to the drawings, FIG. 1 is a block diagram illustrating an embodiment of a welding system 10 that merges manual and automatic control and operation to effectuate welding of a weld joint. As shown, the welding system 10 includes a welding power supply 12 that receives multiple inputs and utilizes those inputs to power, control, and provide supplies to a welding operation. To that end, the welding power supply 12 is coupled to a robotic welding device 14 having a welding torch 16 mounted thereto. The robotic welding device 14 is controlled and powered by the welding power supply 12 to perform a weld operation 18 on a workpiece 20. As may be appreciated, the workpiece 20 may include one or more weld joints to be welded.

The illustrated welding system 10 also includes a weld joint evaluation system 22 and a virtual reality system 24 that cooperate to provide inputs to the welding power supply 12 that may be utilized to control the welding operation 18. The weld joint evaluation system 22, the virtual reality system 24, and the welding power supply 12 each include a variety of internal components that cooperate during operation of the welding system 10. In the illustrated embodiment, the weld joint evaluation system 22 includes an optical imaging system 26. The virtual reality system 24 includes control and processing circuitry 28, memory 30, and an operator interface 32 capable of receiving operator inputs 34 from a welding operator.

The welding power supply 12 includes power conversion circuitry 36 capable of receiving primary power from a primary source, such as alternating current (AC) power source 38. The power supply 12 also includes control circuitry 40 having processing circuitry 42, memory 44, and robot support circuitry 46. As illustrated, the processing circuitry 42 interfaces with a user interface 48 that allows for data settings to be selected by the operator. The operator interface 48 may allow for selection of settings, such as the weld process, the type of wire to be used, voltage and current settings, and so forth. In particular, the system is designed to allow for welding processes, such as metal inert gas (MIG) welding, tungsten inert gas (TIG) welding, stick welding, or any other suitable welding process, to be chosen. In the illustrated embodiment, the welding power supply 12 also includes gas valving 50 coupled to a first gas cylinder 52 via gas conduit 54 and to a second gas cylinder 56 via a second gas conduit 58.

During operation, the control circuitry 40 operates to control generation of welding power output 60 that is supplied to the robotic welding device 14 for carrying out the desired welding operation 18. To that end, the processing circuitry 42 of the control circuitry 40 is coupled to power conversion circuitry 36. The power conversion circuitry 36 is adapted to create the weld power output 60 from the primary power received from the AC power source 38. Various power conversion circuits may be employed, including choppers, boost circuitry, buck circuitry, inverters, converters, and so forth. The configuration of such circuitry may be of types generally known in the art. The power conversion circuitry 36 is generally coupled to a source of electrical power, for example, AC power source 38 in the illustrated embodiment. The power applied to the power conversion circuitry 36 may originate in the power grid, although other sources of power may also be used, such as power generated by an engine-driven generator, batteries, fuel cells or other alternative sources.

The processing circuitry 42 coordinates operation of the robotic welding device 14 through a control signal 62 supplied to the device 14. To that end, the processing circuitry 42 receives and processes a variety of inputs to generate the control signal 62. For example, the processing circuitry 42 communicates with robot support circuitry 46 to receive information regarding the operation of the robotic welding device 14. Further, the processing circuitry 42 receives inputs from the welding operator via the user interface 48. These inputs may include but are not limited to process selection, override commands, weld procedure parameter values or ranges, and so forth. Still further, the processing circuitry 42 controls gas valving 50 to ensure that the desired gas supply 52 or 56 supplies the desired gas 64 to the robotic welding device 14 when gas is desired.

In the depicted embodiment, the virtual reality system 24 operates to generate a data output 66 that is supplied to the processing circuitry 42 of the welding power supply 12. For example, in one embodiment, an operator may utilize the virtual reality system 24 to perform a virtual weld on a simulated weld joint, and this pseudoweld procedure performed by the operator may be recorded into the memory 30 and supplied to the processing circuitry 42 as data output 66. In this embodiment, the operator inputs 34, which may be features of the pseudoweld procedure, such as travel speed, torch angle, and so forth, are communicated via the operator interface 32 to the control circuitry 28 of the virtual reality system 24.

In order to supply the operator a simulated weld environment that mimics that of the actual weld joint to be welded, the control circuitry 28 receives an input 68 from the weld joint evaluation system 22. The weld joint evaluation system 22 is capable of evaluating the weld joint and/or its surrounding environment to gather information regarding features of the weld joint. Features of the weld joint may include material thickness, joint thickness, and so forth. For example, the illustrated weld joint evaluation system 22 includes the optical imaging system 26 that is capable of optically scanning the weld joint. Once scanned, the acquired data may be translated into a visual representation of the weld joint and its associated fixturing and communicated to the control and processing circuitry 28. In this way, a simulated weld joint corresponding to the actual weld joint that will be welded in the welding operation 18 may be generated.

In this manner, before the robotic welding device 14 is enabled to perform the welding operation 18, the device 14 may be trained with the pseudoweld procedure developed by the welding operator. Still further, in some embodiments, once the pseudoweld procedure is developed, the processing circuitry 42 and/or the robot support circuitry 46 may alter the pseudoweld procedure to develop an improved weld procedure. That is, the pseudoweld procedure may be altered within an allowed or permitted window to generate an efficient weld procedure. In this way, one or more operator errors or imperfections may be corrected before the weld procedure is implemented in the welding operation 18, as described in more detail below.

The welding system 10 of FIG. 1 illustrates specific internal components of various systems that interact to control the robotic welding device 14 to perform the welding operation 18. However, the illustrated systems and their respective components are merely examples and are not intended to constrain or limit forms which the illustrated systems may take. Other system configurations and internal components are also within the scope of the disclosed welding systems. For example, in some embodiments, both a robotic welding device 14 and a manual welding device may be coupled to the welding power supply 12 and utilized to perform the welding operation. That is, in some embodiments, the robotic welding device 14 may perform portions of the welding operation and a manual welding device may be operated by an operator to perform the remaining portions of the welding operation. Still further, the illustrated systems may include additional or fewer electrical components than those illustrated.

Figure 2:
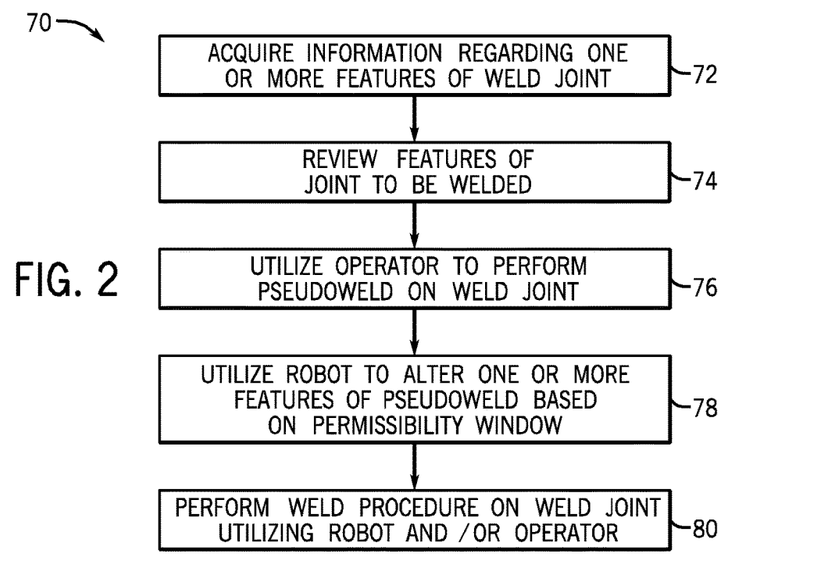
FIG. 2 illustrates a method of controlling the welding system of FIG. 1 to perform a welding operation by utilizing a robotic weld device and/or an operator in accordance with an embodiment of the present disclosure.

FIG. 2 illustrates a method 70 of controlling the welding system 10 of FIG. 1 or a similar automated or semi-automated welding system in accordance with an embodiment of the present disclosure. The method 70 includes acquiring information regarding one or more features of a weld joint (block 72). For example, this step 72 may include scanning a weld joint to determine a visual representation of the weld joint and its associated fixturing. For further example, this step 72 may include downloading three dimensional drawings of the weld joint to determine parameters such as joint thickness, material thickness, energy input, interpass temperature, weld bead profile, and so forth that may affect the weld procedure. Still further, in certain embodiments, the scanned weld joint data may be compared to stored data, and if the difference between the scanned data and the stored data exceeds a preset threshold, a pseudoweld may be performed. In the illustrated embodiment, the method 70 further includes reviewing the weld joint features (block 74) and, if desired, utilizing the feature information to make determinations as to appropriate wire feed speed, weld pass quantity, voltage level, travel speed, and so forth for the given weld joint.

Once weld joint information is acquired, the operator may be prompted to perform a pseudoweld on the simulated weld joint (block 76). That is, the acquired information may be utilized to generate a virtual environment that simulates the weld environment, and the operator may perform a virtual weld in this simulated environment. The virtual weld procedure performed by the welding operator may be recorded as a pseudoweld procedure since the operator is not performing the virtual weld on the actual weld joint. Nevertheless, in particular embodiments, this pseudoweld procedure may be utilized to train the robotic welding device prior to the robotic device encountering the actual weld joint.

Further, the robotic welding device may be utilized to alter one or more features of the pseudoweld procedure based on a predetermined permissibility window (block 78). For example, the robotic welding device may consider the acquired feature information and determine optimal levels for parameters such as wire feed speed, travel speed, and voltage. These determined levels may be compared to those dictated by the operator in the pseudoweld, and the pseudoweld levels may be adjusted by the robotic device to improve the pseudoweld procedure. However, if desired, the robotic welding device may be constrained by a permissibility window. That is, if the desired changes the robotic welding device determines are outside a given window, the changes may not be implemented or the robotic welding device may seek input from an operator before implementing the desired changes. The user may then override or accept these changes. In this way, the pseudoweld procedure may be altered to produce the weld procedure that is to be implemented on the weld joint. Finally, the determined weld procedure is performed on the weld joint by the robotic welding device and/or the welding operator (block 80), as discussed in more detail below.

Figure 3:
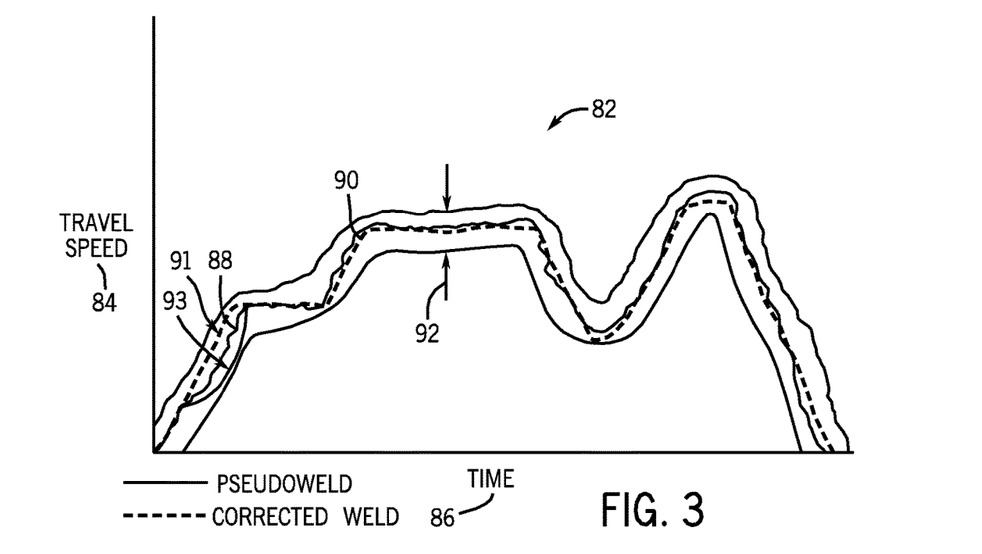
FIG. 3 illustrates a training travel speed versus time plot and a corrected travel speed versus time plot in accordance with an embodiment of the present disclosure.

FIG. 3 illustrates a travel speed versus time plot 82 including a travel speed axis 84 and a time axis 86. The graph 82 includes an example of a pseudoweld plot 88 generated, for example, by an operator performing a virtual weld of the weld joint over a given time interval in a simulated environment. As shown, the pseudoweld plot 88 is corrected by the automated control system to generate a corrected travel speed plot 90. In the illustrated embodiment, the pseudoweld travel speed plot 88 is substantially smoothed by the automated device to increase the efficiency of the actual weld procedure. However, in other embodiments, the plot may be corrected in a variety of other suitable ways. For example, the robotic device may utilize synthetic vision (e.g., a laser scanner capable of scanning the weld joint) and/or arc seam tracking to correct the pseudoweld. As shown, however, the corrected travel speed plot 90 falls within a predefined tolerance 92 that defines an allowed window within which the travel speed may be automatically adjusted. In some embodiments, the allowed window 92 may be defined as a percentage below or above the magnitude of the pseudoweld travel speed plot value.

It should be noted that in some embodiments, the corrected weld plot 90 determined by the automatic welding device may be further modified by a manual operator if desired. For example, the portion 91 of the corrected weld plot 90 may be modified by an operator if a curve such as portion 93 is desired. That is, when the pseudoweld was performed, the operator may have reduced the travel speed during this portion of the graph to address a feature of the weld joint that was recognized by the operator. As such, the curve 93 may be more desirable for inclusion in the corrected weld than the curve 91 determined by the automatic welding device. Accordingly, once determined, the corrected weld plot 90 may be further modified by an operator.

It should be noted that the illustrated plots are merely examples utilizing travel speed over time as an example of one parameter of the pseudoweld procedure that may be corrected by the automated system. However, other features or parameters may be corrected in a similar manner based on allowed windows established for each respective parameter. Further, separate tolerance bands may be independently established for different variables of the weld procedure. For example, in joint tracking procedures, a different tolerance band may be established for travel speed than for how far off-axis the manual or semi-automatic device is allowed before automatic correction is enabled. Indeed, the input from the operator and the input from the automated system regarding parameters of the weld procedure may be merged in any desired way to create a weld procedure that is a hybrid of manual and robotic inputs.

Figure 4:
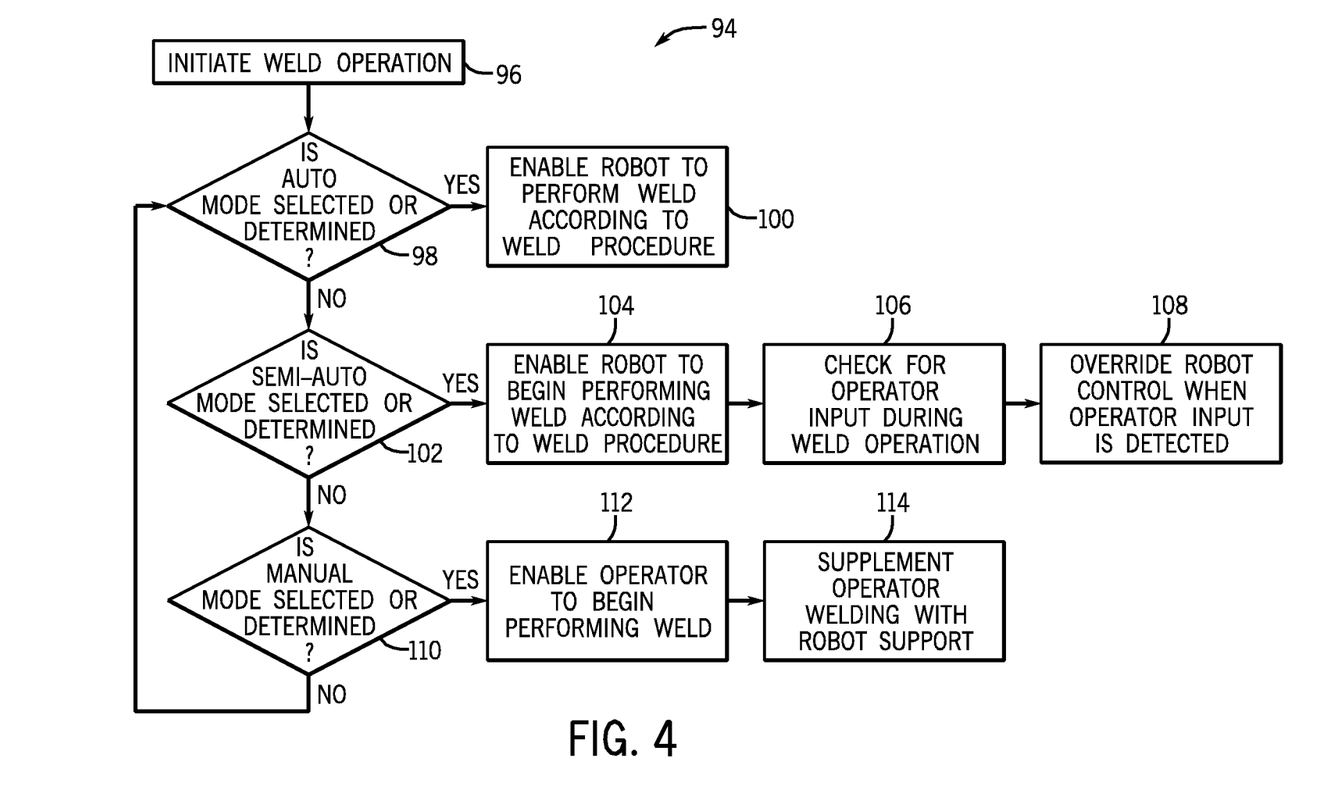
FIG. 4 is a flow chart illustrating an embodiment of a method of controlling the welding system of FIG. 1 to perform a welding operation.

Still further, in addition to teaching the robotic welding device via a merged operator and automated approach, the weld joint may be welded by the robotic welding device, the operator, or a combination thereof. For example, FIG. 4 illustrates control logic 94 that may be utilized to facilitate a merged approach to welding of the weld joint with a robot and an operator. The control logic 94 is utilized when a welding operation has been initiated (block 96). The control circuitry inquires as to whether an auto mode has been selected or determined (block 98). For example, in some embodiments, the operator may choose a mode of operation via selection on a user interface. However, in other embodiments, the control circuitry may determine, for example, based on a preloaded visual representation of the weld joint, which mode is appropriate.

If the auto mode is selected, the robot is enabled to perform the welding operation according to the weld procedure (block 100). In particular embodiments, the weld procedure may be determined by merging a pseudoweld with automated control or may be entirely determined by the robot. If the auto mode is not selected, the control circuitry inquires as to whether a semi-automatic mode is selected (block 102). If so, the robot is enabled to begin performing the weld according to the determined weld procedure (block 104), but the control circuitry monitors for operator input during the weld operation (block 106). For example, the operator may provide input by utilizing a joystick to virtually weld and/or to control the welding performed by the automated device. When operator input is detected, the robot may be disabled and overridden by the operator (block 108), and the operator may complete a portion of the weld. In this way, the operator and the robot may coordinate to complete the weld operation. That is, the robot may be utilized to perform routine welding tasks, while the operator may perform the more intricate portions of the weld.

Still further, if the semi-automatic mode is not selected, the control circuitry checks if manual mode is selected (block 110). If so, the welding system is enabled for operator welding (block 112), but the operator welding may be supplemented with support from the robot (block 114), if desired by the welding operator. It should be noted that during some or all of the described modes, the operator input may take the form of actual welding in the welding environment or virtual welding in a virtual environment. That is, in some embodiments, the operator may perform designated portions of the weld procedure in the virtual environment, and the robot may mimic those virtual welds during the weld operation in the actual weld environment. Indeed, a variety of ways of merging the operator and robotic input may be implemented in accordance with disclosed embodiments.

Figure 5:
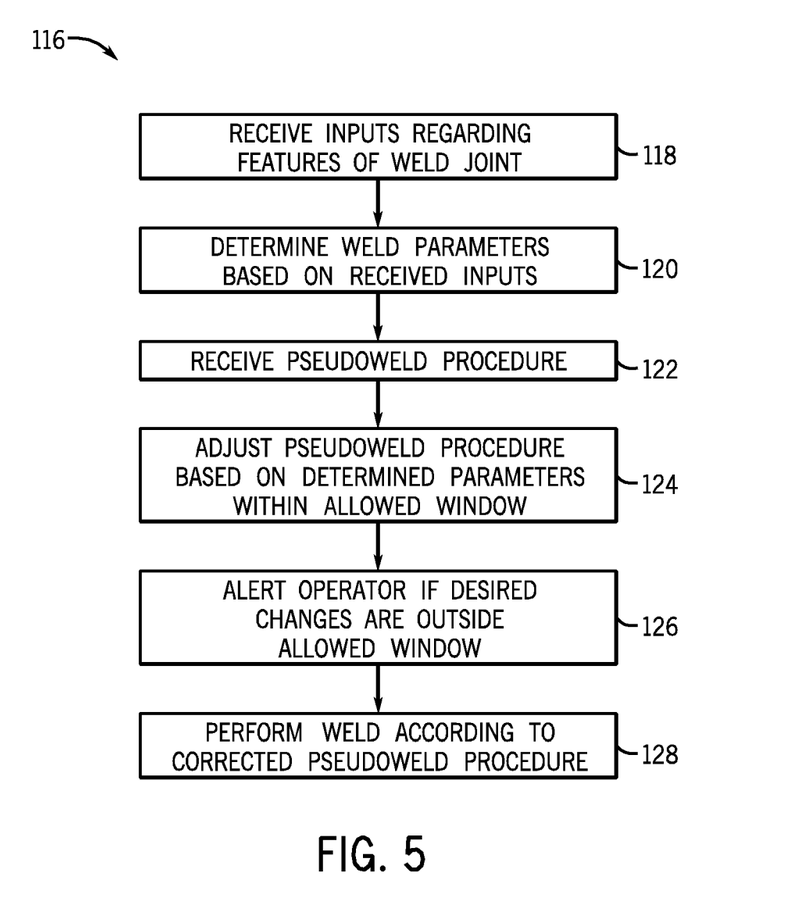
FIG. 5 is a flow chart illustrating an embodiment of a method of controlling the robotic welding device of FIG. 1.

FIG. 5 illustrates control logic 116 associated with a controller of a robotic welding device in accordance with a disclosed embodiment. The control logic 116 includes receiving inputs regarding features of the weld joint (block 118) and determining parameters suitable for use in welding the weld joint based on these features (block 120). In this embodiment, the robotic controller also receives a pseudoweld procedure (block 122), for example, as established by an operator through a virtual reality system. Subsequently, the controller may compare the pseudoweld procedure to the determined suitable parameters to identify one or more differences. If the identified differences are contained within an allowed window, the pseudoweld procedure is adjusted (block 124). However, if the identified differences do not fall within the predetermined allowable dataset, the operator is alerted (block 126), and operator input may be solicited. The operator may then accept or reject the changes proposed by the automated system. Once a weld procedure has been determined in this manner, the controller enables the device to perform the weld (block 128).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of control for an automated welding system, comprising:
   receiving, in processing circuitry, a data set including one or more features of a joint to be welded;
   receiving, in the processing circuitry, a weld procedure for the joint to be welded, wherein the weld procedure for the joint is determined based on a sample virtual weld performed by an operator in a virtual reality system loaded with information about the joint to be welded or a combination of the sample virtual weld performed by the operator in the virtual reality system and a stored procedure developed for a substantially similar weld joint;
   determining, by using the processing circuitry, one or more desired changes to the weld procedure based on the received features of the joint to be welded; and
   generating, by using the processing circuitry, an updated weld procedure by altering one or more parameters of the received weld procedure in accordance with the one or more desired changes, wherein the one or more parameters are included within a predetermined allowable data set.

2. The method of claim 1, comprising alerting the operator when the determined one or more desired changes to the weld procedure are not included in the predetermined allowable data set, the determined one or more desired changes are not within a previously encountered data set, or a combination thereof.

3. The method of claim 1, comprising performing the updated weld procedure on the joint.

4. The method of claim 1, comprising utilizing an imaging system to acquire information regarding an additional feature of the joint and determining the one or more desired changes based in part on the acquired information regarding the additional feature.

5. The method of claim 1, wherein the one or more features of the joint to be welded includes material thickness, energy input, interpass temperature, weld bead profile, or a combination thereof.

6. The method of claim 1, wherein the one or more desired changes include changes in a wire feed speed, a quantity of weld passes, a voltage, a travel speed, torch angle, wire placement, or a combination thereof.

7. The method of claim 1, comprising performing a portion of the weld procedure on the joint and enabling the operator to weld or utilize a virtual torch to weld during a remaining portion of the weld procedure.

8. A welding system, comprising:
a welding power supply comprising power conversion circuitry configured to receive primary power and to convert the primary power to a weld power output;
control circuitry configured to receive a pseudoweld procedure for a weld joint and to generate a weld procedure for welding the weld joint based on the pseudoweld procedure, information regarding a feature of the weld joint, and an allowed parameter set, wherein the pseudoweld procedure comprises a procedure generated by a welding operator for the weld joint via a virtual reality interface loaded with information regarding the weld joint; and
a robotic welding device configured to receive the weld power from the welding power supply and a control signal from the control circuitry, wherein the control signal encodes parameters enabling the robot welding device to perform the weld procedure on the weld joint.

9. The welding system of claim 8, comprising a weld joint evaluation system comprising an imaging system configured to visually evaluate the weld joint and, based on the visual evaluation of the weld joint, communicate the information regarding a feature of the weld joint to the control circuitry.

10. The welding system of claim 8, comprising a virtual reality system having the virtual reality interface and being configured to enable an operator to develop the pseudoweld procedure for the weld joint and to communicate the developed pseudoweld procedure to the control circuitry.

11. The welding system of claim 8, wherein the control circuitry is further configured to enable an auto mode and a semi-auto mode, wherein when the auto mode is enabled, the robotic welding device is configured to perform the weld procedure and when the semi-auto mode is enabled, the robotic welding device is configured to cooperate with an operator to perform the weld procedure.

12. The welding system of claim 8, wherein the allowed parameter set comprises a torch angle tolerance, a travel speed tolerance, a wire feed speed tolerance, or a combination thereof.

13. The welding system of claim 8, wherein the control circuitry is configured to alert an operator to the presence of an error when the generated weld procedure for the weld joint is not within the allowed parameter set.

14. The welding system of claim 8, wherein the robotic welding device comprises an optical detection system configured to monitor the weld joint while the robot welding device is performing the weld procedure on the weld joint.

15. The welding system of claim 8, wherein the robotic welding device comprises an augmented reality system capable of being utilized by an inexperienced welding operator.

16. A method of control for a robotic welding device, comprising:
receiving, from a weld joint evaluation system, a data set including one or more features of a joint to be welded;
receiving, from a virtual reality system, a pseudoweld procedure generated by a welding operator for the joint to be welded in the virtual reality system;
determining, by using processing circuitry, a weld procedure for the joint to be welded based on the received data set and the received pseudoweld procedure;
controlling, by using the processing circuitry, the robotic welding device to perform a weld operation by implementing the weld procedure on the joint to be welded;
receiving, a desired weld procedure change from the welding operator during the weld operation; and
controlling, by using the processing circuitry, the robotic welding device to perform the weld operation by implementing the desired weld procedure change on the joint to be welded when the desired weld procedure change is within a predefined allowable data set.

17. The method of control for the robotic welding device of claim 16, wherein the desired weld procedure change is determined by comparing the pseudoweld procedure established by the welding operator to a weld procedure determined by the robotic welding device.

18. The method of control for the robotic welding device of claim 16, wherein the data set comprises allowable values or ranges for joint thickness, material thickness, energy input, interpass temperature, weld bead profile, or a combination thereof.

19. The method of control for the robotic welding device of claim 16, comprising alerting the welding operator to the presence of an error when the desired weld procedure change is not within the predefined allowable data set.

20. The method of control for the robotic welding device of claim 19, comprising receiving an override command from the welding operator and, when the override command is received, implementing the desired weld procedure change.

* * * * *